United States Patent [19]

Koseki

[11] Patent Number: 4,871,250

[45] Date of Patent: Oct. 3, 1989

[54] BEAM MONITOR FOR A HIGH-OUTPUT LASER

[75] Inventor: Ryoji Koseki, Buena Park, Calif.

[73] Assignee: Amada Engineering Service Co., Inc., La Mirada, Calif.

[21] Appl. No.: 97,275

[22] Filed: Sep. 17, 1987

Related U.S. Application Data

[63] Continuation-in-part of Ser. No. 810,767, Dec. 19, 1985, abandoned.

[51] Int. Cl.[4] .............................................. G01J 1/00
[52] U.S. Cl. ...................................... 356/121; 374/32
[58] Field of Search .................. 356/121; 374/32, 185

[56] References Cited

U.S. PATENT DOCUMENTS

| | | | |
|---|---|---|---|
| 3,579,140 | 5/1971 | Anderson et al. | 372/107 |
| 3,738,168 | 6/1973 | Mansell | 374/32 |
| 3,767,928 | 10/1973 | Bishop et al. | 250/338 |
| 3,867,036 | 2/1975 | Detwiler et al. | 356/121 |
| 4,320,462 | 3/1982 | Lund et al. | 356/121 |
| 4,321,824 | 3/1982 | Martin | 374/32 |
| 4,332,081 | 6/1982 | Francis | 374/185 |
| 4,344,707 | 8/1982 | Massie | 356/121 |
| 4,474,468 | 10/1984 | Shikakura et al. | 356/121 |
| 4,596,461 | 6/1986 | DeRosa et al. | 356/121 |

OTHER PUBLICATIONS

Yeaple, F. "Temperature-Measuring Transducers", *Product Engineering* vol. 32, No. 21, (22 May 1961), pp. 49–52.

Knudtson et al, "Laser Beams Spatial Profile Analysis using a Two-dimensional Photodiode array", *Rev. Sci. Instrum.*, vol. 5, No. 7 (July 1983), pp. 856–860.

*Primary Examiner*—Richard A. Rosenberger
*Attorney, Agent, or Firm*—Wigman & Cohen

[57] ABSTRACT

A beam monitor for a high-output laser has a beam intensity detection means which detects localized beam intensity in the cross section of a high intensity laser beam, and a characteristic calculation means for calculating the beam characteristics of a laser beam based on the localized beam intensity detected by the beam intensity detection means.

12 Claims, 7 Drawing Sheets

BEAM MONITOR FOR A HIGH-OUTPUT LASER

This is a continuation-in-part of co-pending application Ser. No. 810,767 filed on Dec. 19, 1985, now abandoned.

BACKGROUND OF THE INVENTION

1. Field of the invention

The present invention relates to a beam monitor for a high-output laser, and in particular to a beam monitor for a high-output laser which detects a high-output laser beam intensity while detecting the beam characteristics of the mode pattern.

2. Description of the Prior Art

In a high-output laser device used, for example, in a laser process machine, adjustments are made to give the maximum output and to output a beam with an optimum mode pattern for speed and accuracy in processing.

However, in this type of high-output laser transmitter, once the adjustment is made, the alignment of the optical system gradually deteriorates over a period of time for a variety of reasons. As a result, the system must be realigned every few weeks.

Also, when maintenance is being carried out, slight readjustments are necessary after the lenses and mirrors are replaced. This is usually because the centerline of the curve of the mirror does not necessarily coincide with the centerline of the optical system.

As a result, the optical system must be realigned quite frequently.

Figure 1:
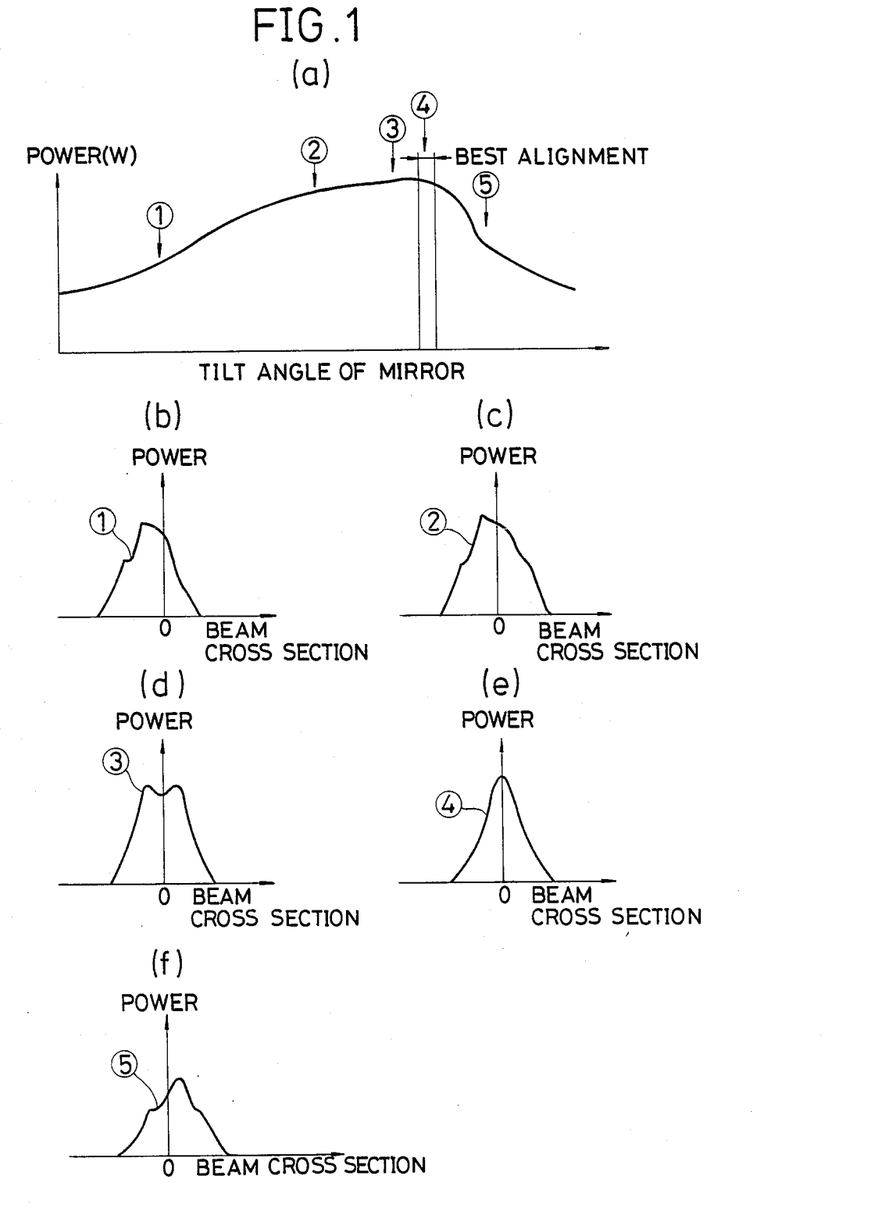

However, if the optical system of the laser transmitter is an ideal resonance system, there is a comparatively simple relationship between the output power and the adjustment angle of the mirror. This relationship is shown in FIGS. 1 (a), (b), (c), (d), (e), and (f). As can be seen from these diagrams, the mirror adjustment angle $\theta$ corresponding to the maximum output, the mirror adjustment angle $\theta$ corresponding to the optimum mode pattern (specifically, the single mode of FIG. 1 (e)) are in agreement. Accordingly, in order to obtain the optimum mirror adjustment angle $\theta$, if, for example, only the output power is monitored, it may be adjusted to give a maximum.

However, the optical system of an actual laser device used in equipment such as a laser processing machine is not usually an ideal resonance system. Therefore, when aligning this type of optical system for a laser device, the output power and the mode pattern are monitored independently, and the optical system must be adjusted so that the output power is at its optimum.

For this reason, in conventional devices, an output power detection sensor is provided on the rear of, for example, the rear mirror, and the beam is directed onto, for example, an acrylic plate, so that a burn pattern is obtained on this acrylic plate. Then, the optical system is aligned based on the values of the output detected by this output sensor and the burn pattern on the acrylic plate.

However, with this type of method, the burn pattern must be reobtained for the degree of adjustment of the optical system, so that the adjustment operation becomes very time-consuming and a high degree of skill is required to perform it.

In addition, the operation of directing the laser beam onto the acrylic plate is extremely dangerous because it is necessary to perform this operation while a high output beam is emitted.

SUMMARY OF THE INVENTION

An object of the present invention is to provide, with due consideration to the drawbacks of such conventional devices, a laser system provided with lasing condition adjusting means, having a beam monitor for a high-output laser which can detect the output power and mode pattern of the high-output laser quickly and accurately, and therefore allows for very easy alignment of the optical system.

A second object of the present invention is to provide a laser system provided with lasing condition adjusting means, having a beam monitor for a high-output laser which can detect the output power and mode pattern simultaneously and display the detected results in real time on a suitable display device.

A third object of the present invention is to provide a laser system provided with lasing conditions adjusting means for a high-output laser which can detect the mode pattern safely.

In order to accomplish these objects the high output laser beam system of the present invention is provided with a beam intensity detection means which can detect a localized beam intensity within the cross section of the beam, and with a means for calculating the prescribed beam characteristics based on the output signal from this beam intensity detection means. Means for adjusting lasting conditions of the laser system in response to the calculated beam characteristics are provided.

BRIEF DESCRIPTION OF THE DRAWINGS

These and other objects, features and advantages of the present invention will become more apparent from the following description of a preferred embodiment taken in conjunction with the accompanying drawings, in which:

FIG. 1 (a) is a graph showing the relationship between the mirror adjustment angle $\theta$ of an ideal resonance system and the output power.

FIGS. 1 (b), (c), (d), (e), and (f) are graphs which show the mode patterns at the mirror adjustment angle positions (1), (2), (3), (4), and (5) respectively in FIG. 1 (a).

DESCRIPTION OF THE PREFERRED EMBODIMENT

Figure 2:
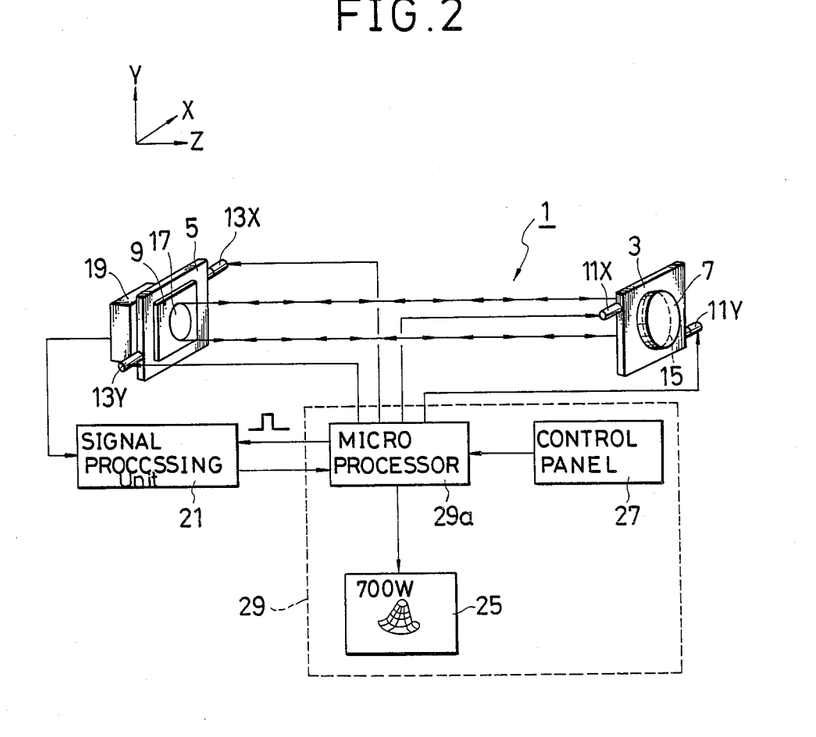
FIG. 2 is a schematic diagram illustrating the laser device equipped with the beam monitor for a high-output laser according to the present invention.

As previously stated, FIG. 2 is a schematic diagram of a laser device equipped with a beam monitor for a high-output laser according to the present invention.

As shown in this drawing, a plurality of frame members 3 and 5 of a laser device 1 is provided with a plurality of mirror holders 7 and 9 for which the surface orientation is freely adjustable. In addition, a plurality of X-axis and Y-axis servo motors 11X, 11Y, and 13X, 13Y are provided on the frame members 3 and 5, respectively for adjusting the orientation of the mirror holders 7, 9 in the X-direction and the Y-direction.

An output mirror 15 and a rear mirror 17 with suitable transmittance are provided in the respective mirror holders.

A beam detection device 19 for measuring the beam characteristics is provided at the rear of the rear mirror 17.

The signal detected from the beam detection device 19 is processed, and various types of beam characteristics are calculated from the processed data. For this, a signal processing section or unit 21 and a microcomputer 29, comprising a microprocessor 29a, a display device 25, and a control panel 27, are provided. These devices are used for controlling the driving of the servo motors 11X, 11Y and 13X, 13Y.

Figure 3:
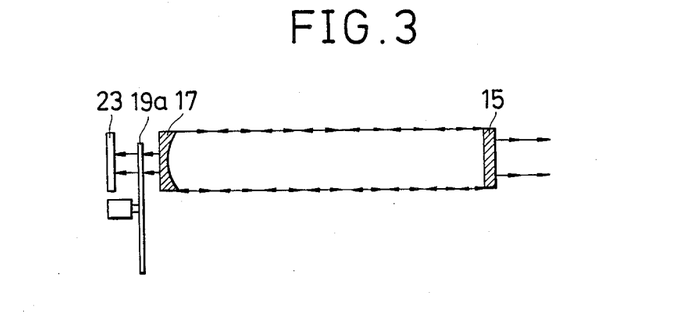
FIG. 3 is a schematic diagram of the optical system of a laser device in accordance with the invention.

FIG. 3 shows the optical system of the laser device 1. Specifically, with this system, the laser beam which is excited between the output mirror 15 and the rear mirror 17 is emitted from the output mirror 15, which has a suitable transmittance, in the direction of the processing section of the laser processing machine, as well as from the rear mirror 17 which has a small transmittance of, for example, about 0.5%. This laser beam is transmitted in the direction of the beam detecting device 19, and, through the medium of, for example, a chopper 19a within that device, is projected onto a beam intensity detection plate 23, which will be later explained.

Figure 4:
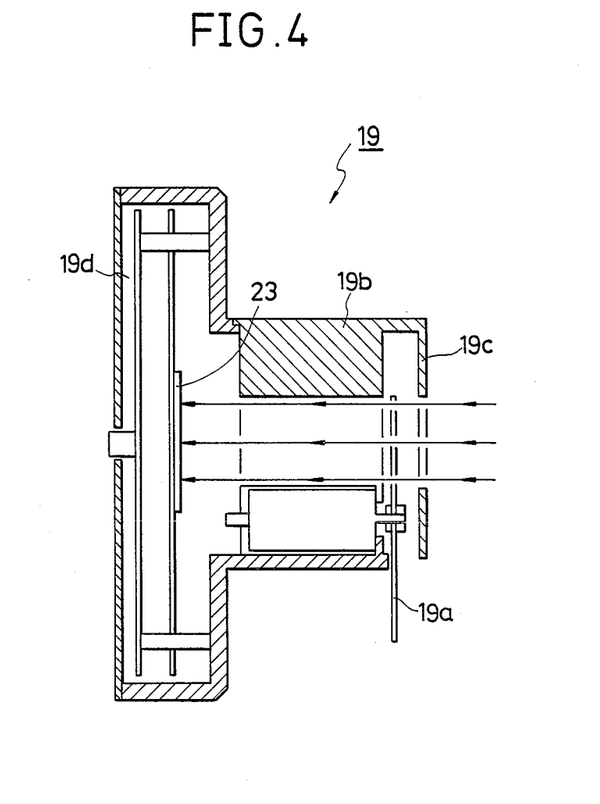
FIG. 4 is a sectional drawing of the beam detection device provided at the rear of the rear mirror on the laser device.

FIG. 4 shows in detail the configuration of the beam detecting device 19. As shown in this drawing, the beam detecting device 19 houses an orifice which suitably throttles the width of the laser beam transmitted from the rear mirror by means of a case 19b, a chopper 19a which reduces the beam intensity as required, and a beam intensity detection plate 23 which detects the localized intensity of the beam input through the medium of the chopper 19a.

The rear mirror holder 9 is integrally mounted with the rear mirror 17 on the case 19b. Accordingly, the beam intensity detection plate 23 is always facing in the same direction as the rear mirror 17 and detects the incident beam entering the rear mirror 17 without affecting its intensity distribution.

The rear surface of the beam detection device 19 is protected by a mesh plate 19d. Consequently, the heat produced at the beam intensity detection plate 23, caused by the projection of the laser beam, is easily radiated through this mesh plate.

Figure 5:
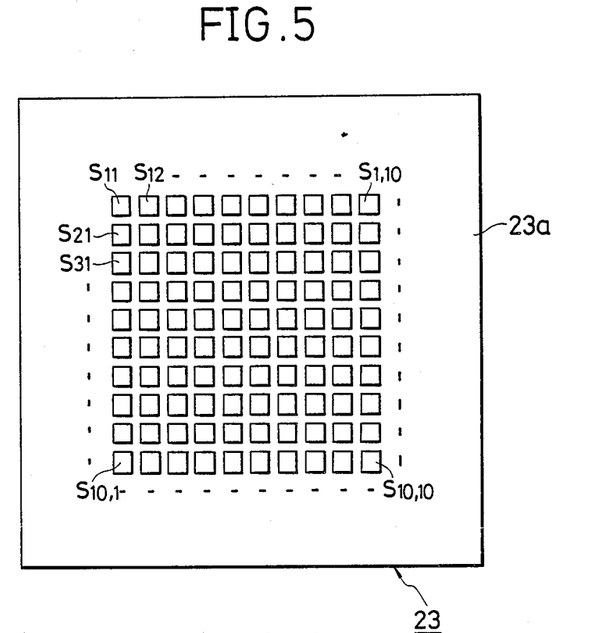
FIG. 5 is a front elevation of the beam intensity detection plate and the beam intensity detection element provided on the beam detection device.

As shown in FIG. 5, the beam intensity detection plate 23 comprises a substrate 23a, almost one inch by one inch square in size and made out of ceramic or similar material, on which is positioned a plurality of beam intensity detection elements $S_{1m}$, specifically 100 beam intensity detection elements $S_{1m}$ (1, m=1, ..., 10) in the form of a 10×10 matrix. These beam intensity detection elements $S_{1m}$ are shown in detail in FIG. 6. As can be seen from FIG. 6, a beam intensity detection element comprises a plurality of I/O terminals 33a and 33b connected to a resistance temperature element 31, the resistivity of which alters according to the temperature. Thus the temperature of the resistance temperature element 31 is in proportion to the emission intensity of the laser beam. Accordingly, the beam intensity detection elements $S_{1m}$ (1, m=1, ..., 10) detect the localized beam intensity at the element positions through the medium of the element resistance values $R_{1m}$ (1, m=1, ..., 10) and the temperatures $T_{1m}$ (1, m=1, ..., 10). Therefore, the mode pattern and output power of the laser beam are detected through the measurement, treatment, and calculation of the resistance values of the beam intensity detection elements $S_{1m}$.

Figure 6:
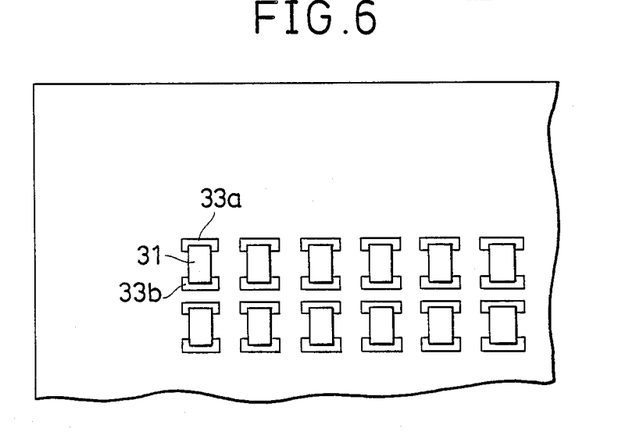
FIG. 6 is an expanded drawing of one part of the beam intensity detection plate and beam intensity detection element.

The beam intensity detection elements $S_{1m}$ are made from a material which posseses a heat resistance such that the performance characteristics of the material does not deteriorate under radiation from a laser beam directly impinged thereon from the rear mirror. Examples of such materials which may be used for the beam intensity detection elements include ceramic, carbon (carbon resistor), platinum, nickel, and copper. The advantages which the matrix sensor of the present invention having such performance characteristics offers over the prior art result from the avoidance of the use of a semiconductor detecting element in the detection arrays. The prior art arrays detect an intensity of light by making use of a process in which electrons occupying lower electronic energy states jump to higher electronic energy states in a semiconductor, so that the performance characteristics of each element deteriorates under the radiation of a high power laser beam.

In other conventional systems, the laser beam output power is also measured by means of the resistance temperature element 31. However, conventional resistance temperature elements are made from a single plate of almost one inch by one inch square dimensions. Consequently, when the intensity of the laser beam varies, about one second is required until thermal equilibrium is attained. As opposed to this, in the case of the beam detection device of the present invention, the time to reach equilibrium is only one millisecond because each of the detection elements is about 0.1 inch by 0.1 inch square. Accordingly, the response speed of the detection device of the present invention is 100 times greater than that of a conventional device, in the case when it is used as an independent output power detection device.

Figure 7:
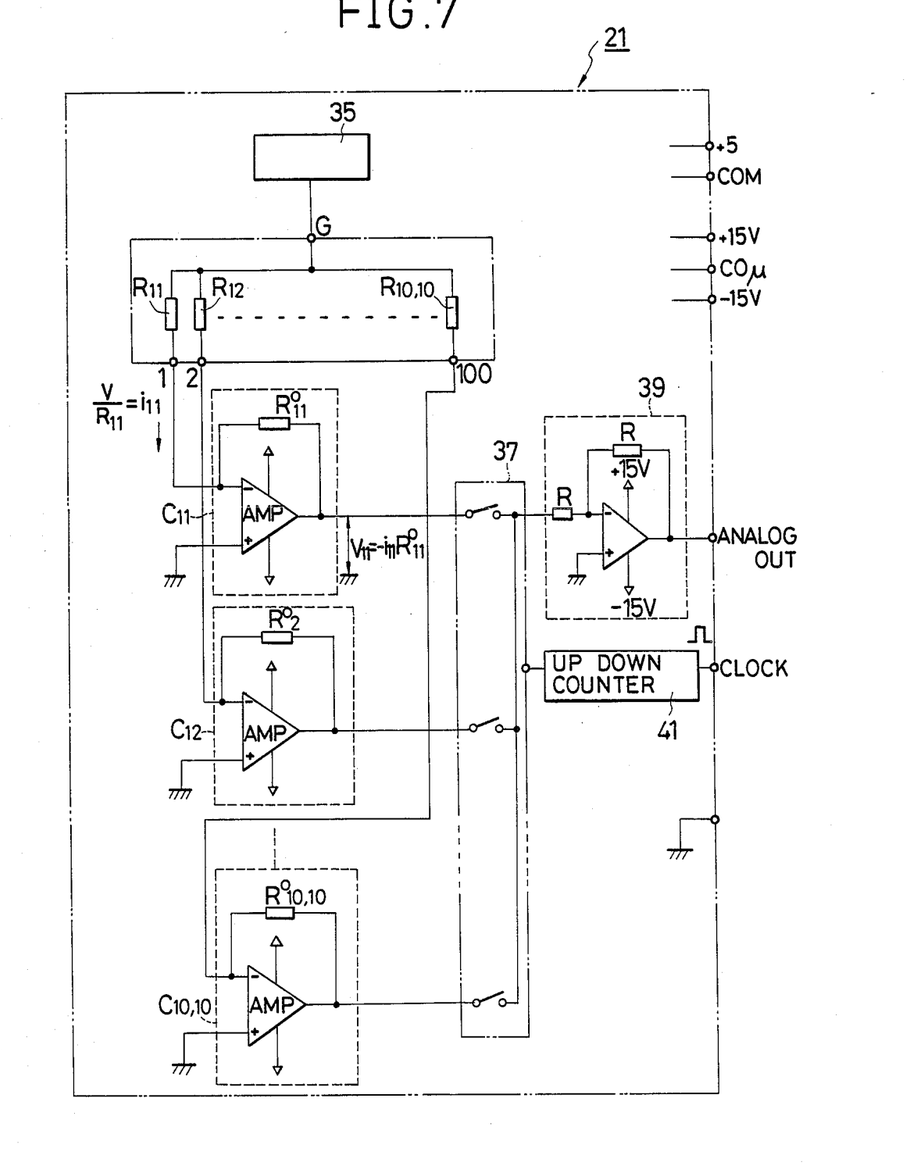
FIG. 7 is a circuit drawing of a signal processing section which outputs the detected output from the beam intensity detecting element as a suitable voltage signal.

FIG. 7 shows the circuit configuration of the signal processing section 21 which measures the resistivity of the beam intensity detection elements $S_{1m}$ and outputs a voltage signal. As is also shown in this diagram, the signal processing section 21 comprises a fixed voltage/power source 35 which feeds a fixed voltage to the beam intensity detection elements $S_{1m}$ (1, m=1, ..., 10) and a current/voltage conversion circuit $C_{1m}$ (1, m=1, ..., 10) which converts the current from the beam intensity detection elements $S_{1m}$ to voltage, as well as an analogue multiplexer 37, an inversion circuit 39, and an up-down counter 41.

Here, the fixed voltage power source 35 provides a uniform voltage V to the beam intensity detection elements $S_{1m}$. Accordingly, a current $I_{1m} = V/R_{1m}$, corresponding to the resistance value $R_{1m}$ of each element, flows in each of the beam intensity detection elements $S_{1m}$.

The current/voltage conversion circuit $C_{1m}$, connected to the output terminals of each of the beam intensity detection elements $S_{1m}$, imposes a negative feedback on an operational amplifier through a designated resistance $R_{1m}$. Accordingly, when the current $I_{1m}$ from the element $S_{1m}$ is input to the negative input terminal of the operational amplifier, a voltage $I_{1m} = -I\ 1m$ . $V_{1m} = I_{1m}\ R_{1m}^0$, which is proportional to the current $I_{1m}$, is output to this output terminal.

Accordingly, an output voltage $$V_{1m} = (R_{1m}^o/R_{1m})\ V$$

which is inversely proportional to the resistance of the beam intensity detection element $S_{1m}$ is output to the output terminal of the current/voltage conversion circuit $C_{1m}$.

The output voltage of the current/voltage conversion circuit $C_{1m}$ is input to a selected terminal of the analogue multiplexer 37.

The output signal from the up-down counter 41 is input to a selected common terminal on the analogue multiplexer 37. The up-down counter 41 up-counts, for example, a stepping clock pulse from the microprocessor, and outputs the value obtained from this count to the analogue multiplexer 37.

Accordingly, when the analogue multiplexer 37 receives the count value from the up-down counter 41, it selects a terminal corresponding to the count value, and outputs the voltage signal $V_{1m} = -(R^0{}_{1m}/R_{1m})$ from the selected terminal to the output terminal.

An inversion circuit 39 is connected to the output terminal of the analogue multiplexer 37. When this inversion circuit 39 receives the voltage signal $V_{1m} = -(Rhu\ o_{1m}/R_{1m})$, it inverts the polarity and outputs the inverted voltage signal to the microcomputer 29 through the output terminal of the signal processing section 21.

Accordingly, this signal processing section 21 converts the resistance value $R_{1m}$ of each beam intensity detection element to the voltage signal $V_{1m}$, and outputs said voltage signal $V_{1m}$ to the microcomputer 29 in sequential order with the stepping clock signal from the microcomputer 29.

Figure 8:
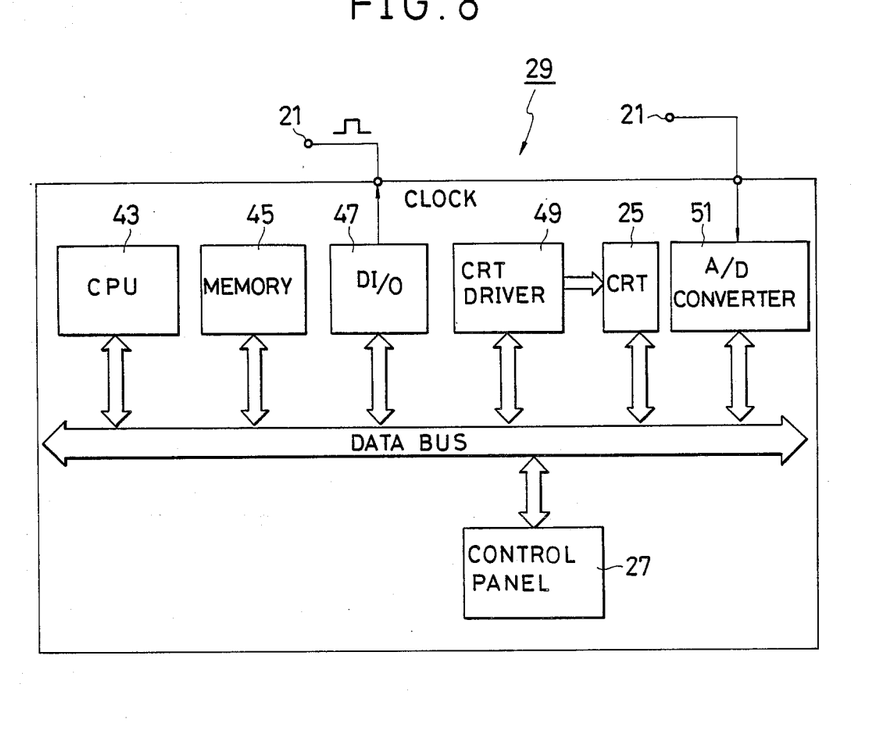
FIG. 8 is a block diagram of a microcomputer which converts the voltage signal from the signal processing section into digital data and then calculates the laser beam output power and the mode pattern from the digital data, and displays the results.

As indicated in FIG. 8, the microcomputer 29 comprises a CPU 43, a memory 45, a DI/O 47, a CRT driver 49, a CRT display 25, an A/D converter 51, and a control panel 27.

The DI/O 47 outputs the stepping clock signal to the signal processing section 21.

The A/D converter 51 converts the voltage signal $V_{1m} = -(R^o{}_{1m}/R_{1m})\ V$ from the signal processing section 21 to digital data $D\ 1m$.

Further, this digital data $D_{1m}$ includes various scattered data caused by effects such as the spread of the characteristics of the beam intensity detection elements $S_{1m}$ (1, m=1, ..., 10).

The CPU 43 first compensates for the scattering of the digital data $D_{1m}$. Once the CPU has carried out such compensation, it then computes the beam intensity $P_{1m}$ at each beam intensity detection element position corresponding to the data $D_{1m}$. In addition, the CPU 43 calculates the output power $P_{out}$ for the laser beam, based on the formula $$P_{out} = \frac{To}{Tr}\ \Sigma_{lm}\ P_{lm}$$

from the calculated results $P_{1m}$. Here, to and tr are the transmittances of the output mirror and the rear mirror respectively.

The memory 45 stores such data as $P_{1m}$ and $P_{out}$ at designated addresses.

The CRT display 25 plots each beam intensity $P_{1m}$ on the X and Y coordinates indicated on the screen which correspond to the beam cross section, as well as displays the output power $P_{out}$ in a suitable position on the screen. In this way, the laser beam mode pattern and the output power are displayed on the CRT display. The CRT driver 49 controls the CRT 25.

The operating panel 27 references the mode pattern and output power on the CRT display. The operator makes appropriate adjustments of the output mirror 15 or the rear mirror 17 by suitably driving the servomotors 11X and 13X for the X axis or the servomotors 11Y and 13Y for the Y axis.

Next, this embodiment of the present invention will be explained with reference to FIGS. 2 to 10.

When a laser beam is excited between the suitably adjusted output mirror 15 and rear mirror 17 one part of this laser beam is transmitted through the rear mirror 17 and projected onto the beam intensity detection elements $S_{1m}$ of the beam intensity detection plate 23.

Then, the temperatures of each of the beam intensity detection elements $S_{1m}$ are respectively elevated, corresponding to the position in which the individual elements are placed, and each of these elements assumes a suitable resistance value corresponding to these elevated temperatures.

This resistance value is detected by the current/voltage conversion circuit $C_{1m}$ connected to these elements, and is output to a selected terminal of the analogue multiplexer 37 as a voltage signal $V_{1m}$.

When the microprocessor 29 is operated, a suitable stepping clock pulse is output through the $D_i/O_{47}$.

When this stepping clock pulse is input to the up-down counter 41 of the signal processing section 21, the updown-counter 41 adds up the number of pulses and outputs the cumulated value to the analogue multiplexer 37.

Next, the analogue multiplexer 37 selects the terminals corresponding to the cumulated values from the multiple selected terminals, and outputs the voltage signals $V_{1m}$, which are input through the selected terminals to the output terminal. For example, in the case where the cumulated value is '2', the voltage signal $V_{12}$ from the detection element $S_{12}$ which is the second among the beam output elements, is output to the output terminal.

This voltage signal, after being inverted in the inversion circuit 39, is input to the A/D converter 51 of the microcomputer 29 through the output terminal of the signal processing section 21. After being suitably compensated and calculated, it is stored in the corresponding address of the memory 45.

This procedure is repeated each time a pulse is output from the stepping clock. When the voltage signals $V_{1m}$ from the beam intensity detection elements $S_{1m}$ have all been read into the microcomputer, the output from the stepping clock is terminated and the signal read-in action stops.

Figure 9:
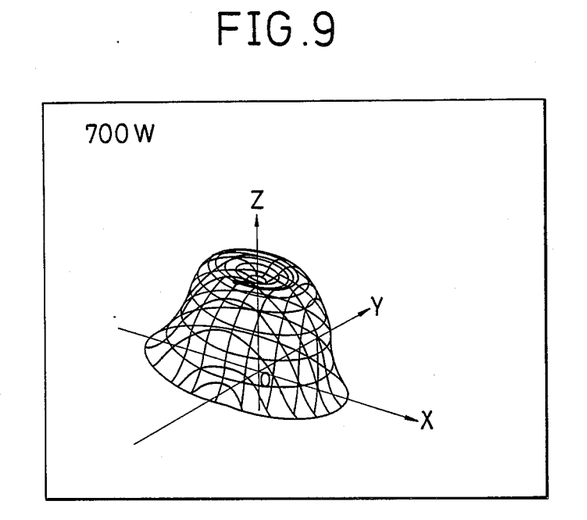
FIG. 9 and FIG. 10 are illustrations of the output power and mode patterns displayed on the CRT screen of the microcomputer.

After this signal read-in is completed and the operator enters a display command, the beam intensities $P_{1m}$ are read out from memory in sequential order and displayed on the X-Y plane corresponding to the beam cross-section, an example of which is shown in FIG. 9.

In addition, at the same time, the output power $P_{out}$ of the laster beam is read out from the memory 45 and is displayed on the left hand side of the CRT display screen. (For example, 700W is displayed in FIG. 9).

The mode pattern and output power of the laser beam are thus displayed in real time on the CRT display.

Accordingly, the operator can easily adjust the alignment of the output mirror 15 and the rear mirror 17 by referring to this display.

If, for example, a multimode pattern occurs, such as the mode pattern illustrated in FIG. 9, the optical axis of the mirror should be slightly inclined along the X- or Y- axis by a command from the control panel.

The X-axis servomotors 11X and 13X, or the Y-axis servomotors 11Y and 13Y are then driven so that the alignment of the output mirror 15 or rear mirror 17 is suitably revised.

Figure 10:
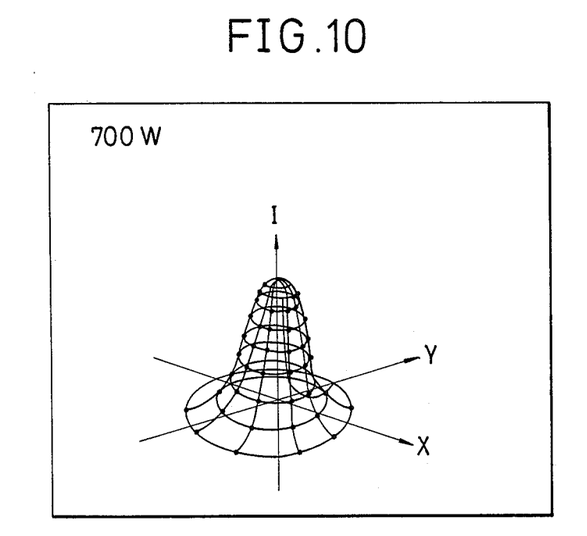

When the display command is once again entered, by means of the actions outlined above, the detection signal $V_{1m}$ from the beam intensity detection elements $S_{1m}$ is once again entered into the microcomputer 29, and from the action of the CPU the beam pattern and output power are once again displayed on the screen as, for example, indicated in FIG. 10.

In this way, the operator, while referring to both the beam pattern and output power as they appear on the screen, adjusts the alignment of the output mirror and the rear mirror. The alignment operation for both the beam pattern and output power is completed as indicated in FIG. 10, for example, to give the optimum value for the laser process.

Accordingly, by means of this embodiment of the present invention, multiple detection elements are positioned on the cross sectional surface of the laser beam, and by processing the signals detected from the detection elements, both the mode pattern and the output power are displayed in real time on the CRT screen so that the alignment of the optical system is easily and quickly adjusted.

In addition, it is unnecessary for the hand or other parts of the body to approach the optical path of the laser beam to obtain a burn pattern, as is required with conventional devices, so that the operation is carried out in complete safety.

Furthermore, although resistance temperature elements are used as the beam intensity detection elements in this embodiment of the present invention, thermocouples may also be used in their place. The thermocouples are made of a material selected from the group of ceramic material, carbon platinum, nickel and copper.

In addition, although beam detection elements are arranged in their respective positions in the cross section of the beam in this embodiment, it is also acceptable to provide, for example, a scanning device to scan each small cross sectional element on the beam and detect the beam intensity from this scanning device, then handle the detected signals using the same procedures as outlined above.

Also, the chopper which has been positioned in front of the beam detection elements in this embodiment of the present invention can be omitted.

After suitable treatment of the signal detected from the beam detection device, it is possible to feed back the signal to the pulse generating unit of the laser device to control the discharge current. As previously outlined the response time of the beam detection device is about one millisecond, The discharge current, at that instant, is adjusted to the optimum, corresponding to an instantaneous beam intensity. Accordingly, through this action, power stability of the laser device at both low output and high output can be ensured.

What is claimed is:

1. A gas laser system provided with lasing condition adjusting means comprising:
   an output mirror;
   a rear mirror having a predetermined transmittance positioned opposite said output mirror;
   an optical cavity defined by said output mirror and said rear mirror;
   a pair of discharge electrodes for generating a discharge within a gas supplied to the cavity;
   a pulse generating unit for applying a pulse voltage between said pair of electrodes;
   means for adjusting the orientations of said output mirror and said rear mirror;
   a matrix sensor means comprising a plurality of resistance temperature elements located behind said rear mirror for receiving a laser beam passing through said rear mirror;
   a display means for visually indicating an instant mode resonance pattern taking place in said optical cavity on the basis of the output of said matrix sensor means;
   a control panel means for manually inputting a correction value of the orientation of said mirrors with reference to said mode pattern displayed;
   a processor means for controlling said orientation adjustment means in accordance with said correction value;
   means for calculating output power based upon the ouptut of said matrix means; and
   means for controlling the pulse generating unit in accordance with said output power, so that the discharge current is adjusted to the optimum corresponding to an instantaneous output power.

2. The laser system of claim 1 wherein the plurality of resistance temperature elements comprises an n x n matrix wherein n is larger than 2 and said resistance temperature elements are made of a material which possesses a heat resistance such that performance characteristics of the material do not deteriorate under radiation of a laser beam directly impinged thereon from said rear mirror and said resistance temperature elements are selected with a size such that they reach thermal equilibrium within about one millisecond.

3. The laser system of claim 2 further comprising an inversion circuit means for inverting the selected voltage signal output from the current/voltage conversion circuit means and inputting said signal to said processor means.

4. The laser system of claim 2 wherein said resistance temperature elements are selected with a size such that they reach thermal equilibrium in one millisecond.

5. The laser system of claim 2 wherein said matrix sensor means comprises a 10x10 matrix of resistance temperature elements.

6. The laser system of claim 2 wherein the size of said resistance temperature elements is about 0.1 inch square and further comprising an up-down counter means for receiving a timing pulse, selecting a voltage spiral output from a current/voltage conversion circuit means and outputting as an output the selected voltage signal.

7. A laser system of claim 6, wherein said resistance temperature elements are made of ceramic material.

8. The laser system of claim 6 wherein said resistance temperature elements are made of a material selected from the group of carbon, platinum, nickel, and copper.

9. The laser system of claim 2 wherein said resistance temperature elements are made of a material selected from the group of ceramic material, carbon, platinum, nickel, and copper.

10. The laser system of claim 1 wherein said resistance temperature elements are made of a material selected from the group of ceramic material, carbon, platinum, nickel and copper.

11. A gas laser system provided with lasing condition adjusting means comprising:
an output mirror;
a rear mirror having a predetermined transmittance positioned opposite said output mirror;
an optical cavity defined by said output mirror and said rear mirror;
a pair of discharge electrodes for generating a discharge within a gas supplied to the cavity;
a pulse generating unit for applying a pulse voltage between said pair of electrodes;
means for adjusting the orientations of said output mirror and said rear mirror;
a matrix sensor means comprising a plurality of thermocouples located behind said rear mirror for receiving a laser beam passing through said rear mirror;
a display means for visually indicating an instant mode resonance pattern taking place in said optical cavity on the basis of the output of said matrix sensor means;
a control panel means for manually inputting a correction value of the orientation of said mirrors with reference to said mode pattern displayed;
a processor means for controlling said orientation adjusting means in accordance with said correction value;
means for calculating output power based upon the ouptut of said matrix means; and
means for controlling the pulse generating unit in accordance with said output power, so that the discharge current is adjusted to the optimum corresponding to an instantaneous output power.

12. The laser system of claim 11 wherein said thermocouples are made of a material selected from the group of ceramic material, carbon, platinum, nickel, and copper.

* * * * *